(12) United States Patent
Tellado et al.

(10) Patent No.: US 7,366,231 B2
(45) Date of Patent: Apr. 29, 2008

(54) SUB-BLOCK DOMAIN TRANSFORMATION MULTIPLE SIGNAL PROCESSING

(75) Inventors: Jose Tellado, Sunnyvale, CA (US); Sanjay Kasturia, Palo Alto, CA (US); Eran Cohan, Cupertino, CA (US)

(73) Assignee: Teranetics, Inc., Santa Clara, CA (US)

( * ) Notice: Subject to any disclaimer, the term of this patent is extended or adjusted under 35 U.S.C. 154(b) by 178 days.

(21) Appl. No.: 10/816,409

(22) Filed: Apr. 1, 2004

(65) Prior Publication Data
US 2005/0089101 A1 Apr. 28, 2005

Related U.S. Application Data

(63) Continuation-in-part of application No. 10/695,166, filed on Oct. 28, 2003.

(51) Int. Cl.
*H04B 1/38* (2006.01)
(52) U.S. Cl. .................................... 375/219
(58) Field of Classification Search ............... 375/130, 375/222, 249, 229, 346; 370/210, 276, 286, 370/289; 379/3, 406.012, 406.16; 455/570
See application file for complete search history.

(56) References Cited

U.S. PATENT DOCUMENTS

| | | | |
|---|---|---|---|
| 6,678,319 B1 | 1/2004 | Jamali | |
| 6,707,848 B2 | 3/2004 | Agazzi et al. | |
| 7,092,352 B2* | 8/2006 | Shattil | 370/210 |
| 2004/0170230 A1 | 9/2004 | Zimmerman et al. | |
| 2004/0213146 A1 | 10/2004 | Jones et al. | |
| 2006/0023645 A1* | 2/2006 | Hench | 370/276 |

* cited by examiner

*Primary Examiner*—Sam K. Ahn
(74) *Attorney, Agent, or Firm*—Brian R. Short

(57) ABSTRACT

Embodiments of an Ethernet transceiver are disclosed. The Ethernet transceiver includes a plurality of digital signal streams, at least one digital signal stream being coupled to another of the digital signal streams. A domain transformer transforms sub-blocks of each of the plurality of the digital signal streams from an original domain into a lower complexity domain. A processor joint processes the transformed sub-blocks of the digital signal streams, each joint processed digital signal stream sub-block is influenced by other digital signal streams sub-blocks. An inverse transformer inverse transforms the joint processed signal streams sub-blocks back to the original domain.

50 Claims, 9 Drawing Sheets

TRANSFORMING SUB-BLOCKS OF A PLURALITY OF THE DIGITAL SIGNAL STREAMS FROM AN ORIGINAL DOMAIN INTO A LOWER COMPLEXITY PROCESSING DOMAIN

910

JOINT PROCESSING OF THE TRANSFORMED SUB-BLOCKS OF THE DIGITAL SIGNAL STREAMS, EACH JOINT PROCESSED DIGITAL SIGNAL STREAM SUB-BLOCK BEING INFLUENCED BY CHARACTERISTICS OF OTHER DIGITAL SIGNAL STREAM SUB-BLOCKS

920

INVERSE TRANSFORMING THE JOINT PROCESSED SIGNAL STREAM SUB-BLOCKS BACK TO THE ORIGINAL DOMAIN

930

FIGURE 9 ns 212, 214, 216, 218 in parallel. The first connection 212
SUB-BLOCK DOMAIN TRANSFORMATION MULTIPLE SIGNAL PROCESSING

RELATED PATENT APPLICATION

The patent application is a continuation in part of patent application Ser. No. 10/695,166, titled "A Method and Apparatus for Domain Transformation, and filed Oct. 28, 2003.

FIELD OF THE INVENTION

The invention relates generally to network communications. More particularly, the invention relates to a method and apparatus for sub-block domain transformation multiple signal processing.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of an Ethernet transceiver pair communicating over a bi-directional transmission channel, according to the prior art. The transceiver pair includes a first transceiver 100 and a second transceiver 105. The first transceiver 100 includes a transmitter section 110 that receives digital data for transmission over a transmission channel 135. The first transceiver 100 also includes a receiver section 120 that receives data.

The transceiver includes a digital to analog converter (DAC) for transmission, and an analog to digital converter (ADC) for reception. The hybrid circuit 130 is designed to reduce the level the transmit signal present in the receive signal path. The transmitter section 110 and the receiver section 120 are connected to a common twisted pair causing some of the transmission signals of the transmitter section 110 to be coupled into the receive signals of the receiver section 120. The coupled signal can be referred to as an "echo" signal.

The hybrid circuit 140 of the second transceiver 105 operates in the same manner as the hybrid circuit 130 of the first transceiver 100. The transmitter section 150 and the receiver section 160 of the second transceiver 105 operate in the same manner as the transmitter section 110 and receiver section 120 of the first transceiver 100.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs.

FIG. 2 shows several Ethernet twisted pair LAN connections 212, 214, 216, 218 in parallel. The first connection 212 is between a first transmitter 115a (S1A) and first receiver 125a (R1A), and a second transmitter 115b (S1B) and a second receiver 125b (R1B). The second connection 214 is between a third transmitter 135a (S2A) and third receiver 145a (R2A), and a fourth transmitter 135b (S2B) and a fourth receiver 145b (R2B). The third connection 216 is between a fifth transmitter 155a (S3A) and fifth receiver 165a (R3A), and a sixth transmitter 155b (S3B) and a sixth receiver 165b (R3B). The fourth connection 218 is between a seventh transmitter 175a (S4A) and seventh receiver 185a (R4A), and an eighth transmitter 175b (S4B) and an eighth receiver 185b (R4B).

The twisted pair LAN connections 212, 214, 216, 218 are located physically proximate, and interference between the twisted pairs 212, 214, 216, 218 is caused by interactions between signals of the twisted pair LAN connections 212, 214, 216, 218. Interference can also be caused by connectors of the twisted pair LAN connections. The interference is in the form of far end cross-talk (FEXT) and near-end cross-talk (NEXT). NEXT is caused by interference due to signals generated at the near-end of a neighboring twisted pair connection. For example, NEXT interference includes the transmitter signals S1A, S3A, S4A of transmitters 115a, 155a, 175a interfering with receiver signal R2A of receiver 145a. FEXT is caused by interference due to signals generated at the far-end of a neighboring twisted pair connection. For example, FEXT interference includes the transmitter signals S1B, S3B, S4B of transmitters 115b, 155b, 175b interfering with receiver signal R2A of receiver 145a. Other interference includes the echo signal. For example, the echo signal includes interference the signal S2A of transmitter 135a interfering with the receiver signal R2A of receiver 145a. Additional interference includes inter-symbol interference (ISI). ISI is self-interference of the transmit signal S2B at the input R2A of the receiver 145a. Other interference can include alien signal interference. Alien signal interference generally includes interference due to other Ethernet twisted pair LAN connections of cables that may be proximate to the twisted pair cable of the signal of interest.

Present Ethernet technology can include time domain processing of digital signal streams for minimization of signal interference. As the data frequencies of the digital signal streams increases, the electronic hardware required to implement the time domain processing increases dramatically.

Digital filtering is generally used to reduce the signal interference of Ethernet signals. Digital communications systems use filtering for many functions. These functions include adjacent and co-channel interference rejection, equalization, echo canceling and cross-talk canceling. Finite impulse response (FIR) filtering can be utilized to reduce signal interference. FIR filtering can require complex circuit implementations. For example, if an FIR filter has a length P (samples), P multiply and accumulate (MAC) operations are required per filtered output signal. High performance communication systems (this generally refers to high throughput systems) the length of the FIR filters can be much greater. The electronic circuitry required to implement high performance FIR filters can become very large, requiring greater cost and higher power dissipation. High performance filters can require lengths (P) of 50-1000 taps in which each tap operates on a sampled signal delayed by one (or fraction of one) symbol period from the previous tap.

Additionally, high performance systems can require several filters.

A Gigabit Ethernet system can require echo, NEXT and FEXT cancellation and equalization. Additionally, Ethernet systems generally include 4 adjacent twisted pair connections per communication link, requiring NEXT and FEXT cancellation for each of the pairs. The twisted pairs of a communication link can additionally alien NEXT cancellation due to interference received from other twisted pair communication links.

It is desirable to have an apparatus and method for a high throughput transceiver that provides for pre-processing and post-processing of digital signal streams for minimization of interference of Ethernet LAN signals. It is desirable to minimize the latency of the pre-processing and post-processing. The processing should require a minimal amount of electronic hardware, and dissipate a minimal amount of power. Alternatively, the processing should enable higher data transmission rates, and allow for longer transmission channels using comparable hardware and power dissipation.

SUMMARY OF THE INVENTION

The invention includes an apparatus and method for pre-processing and post-processing of digital signal streams for minimization of interference (including self-interference, ISI and cross-talk interference) of Ethernet LAN signals. The apparatus and method of processing provides control over latency of the pre-processing and post-processing. The processing can be implemented with a minimal amount of electronic hardware, dissipate a minimal amount of power, and provide better performance.

An embodiment of the invention includes an Ethernet transceiver. The Ethernet transceiver includes a plurality of digital signal streams, at least one digital signal stream being coupled to another of the digital signal streams. A domain transformer transforms sub-blocks of each of the plurality of the digital signal streams from an original domain into a lower complexity domain. A processor joint processes the transformed sub-blocks of the digital signal streams, each joint processed digital signal stream sub-block is influenced by other digital signal streams sub-blocks. An inverse transformer inverse transforms the joint processed signal streams sub-blocks back to the original domain.

Another embodiment of the invention includes a method of joint processing a plurality of digital signal streams. The method includes transforming a plurality of the digital signal streams from an original domain to a lower complexity-processing domain, joint processing of the transformed sub-blocks of the digital signal streams, each joint processed digital signal stream sub-block being influenced by characteristics of other digital signal stream sub-blocks, and inverse transforming the joint processed signal stream sub-blocks back to the original domain.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 9 shows acts of a method of joint processing a plurality of digital signal stream sub-blocks, according to an embodiment of the invention.

DETAILED DESCRIPTION

Figure 1:
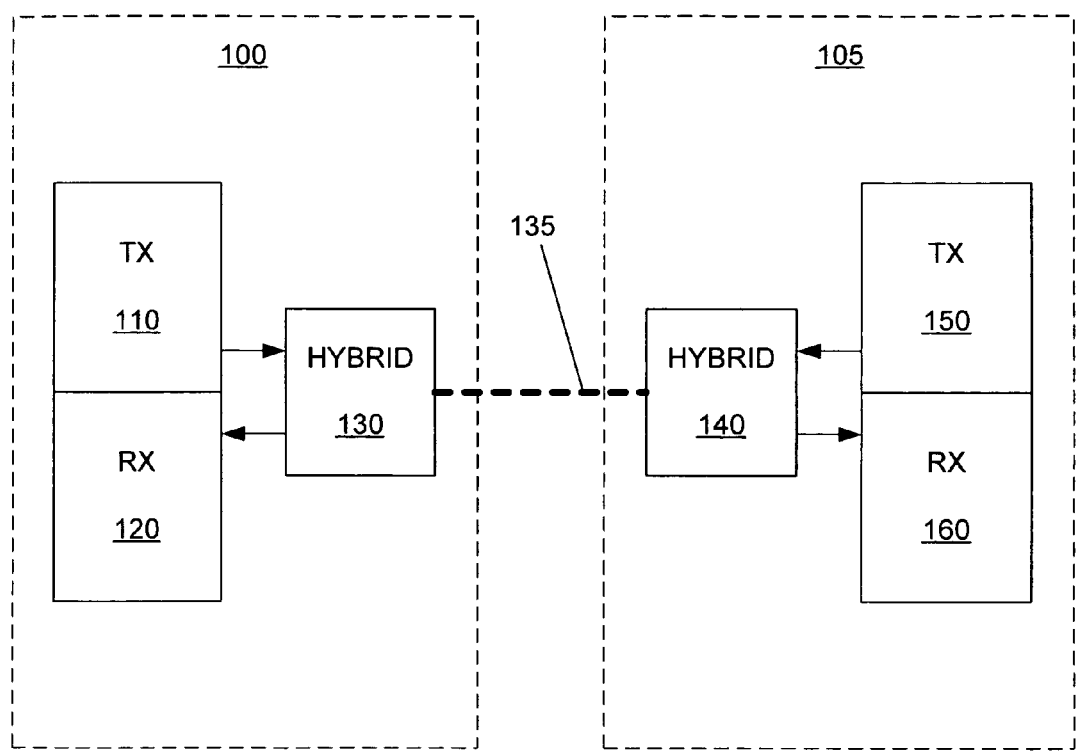
FIG. 1 shows a block diagram of a transceiver pair communicating over a bi-directional transmission channel, according to the prior art.
Figure 2:
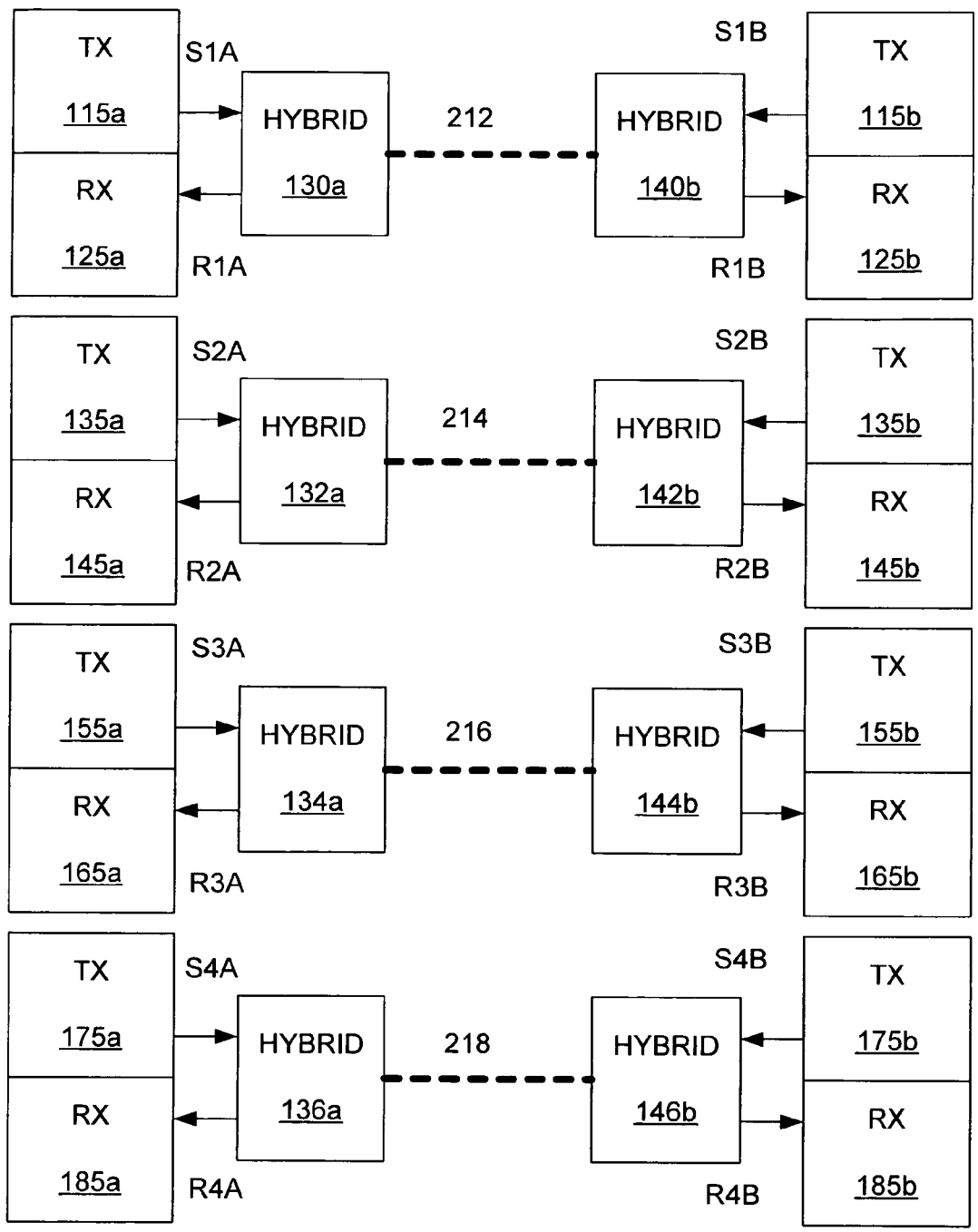
FIG. 2 shows a plurality of transceiver pairs located adjacently, and suffering from cross-talk coupling between signal streams of the transceiver pairs, according to the prior art.

As shown in the drawings for purposes of illustration, the invention is embodied in an apparatus and method for a high throughput transceiver that includes signal processing for minimizing interference (self-interference, ISI and cross-talk interference) between parallel signals, and minimizes the effects of echo signals. The transceiver can provide some control over the latency of the signal processing.

Figure 3:
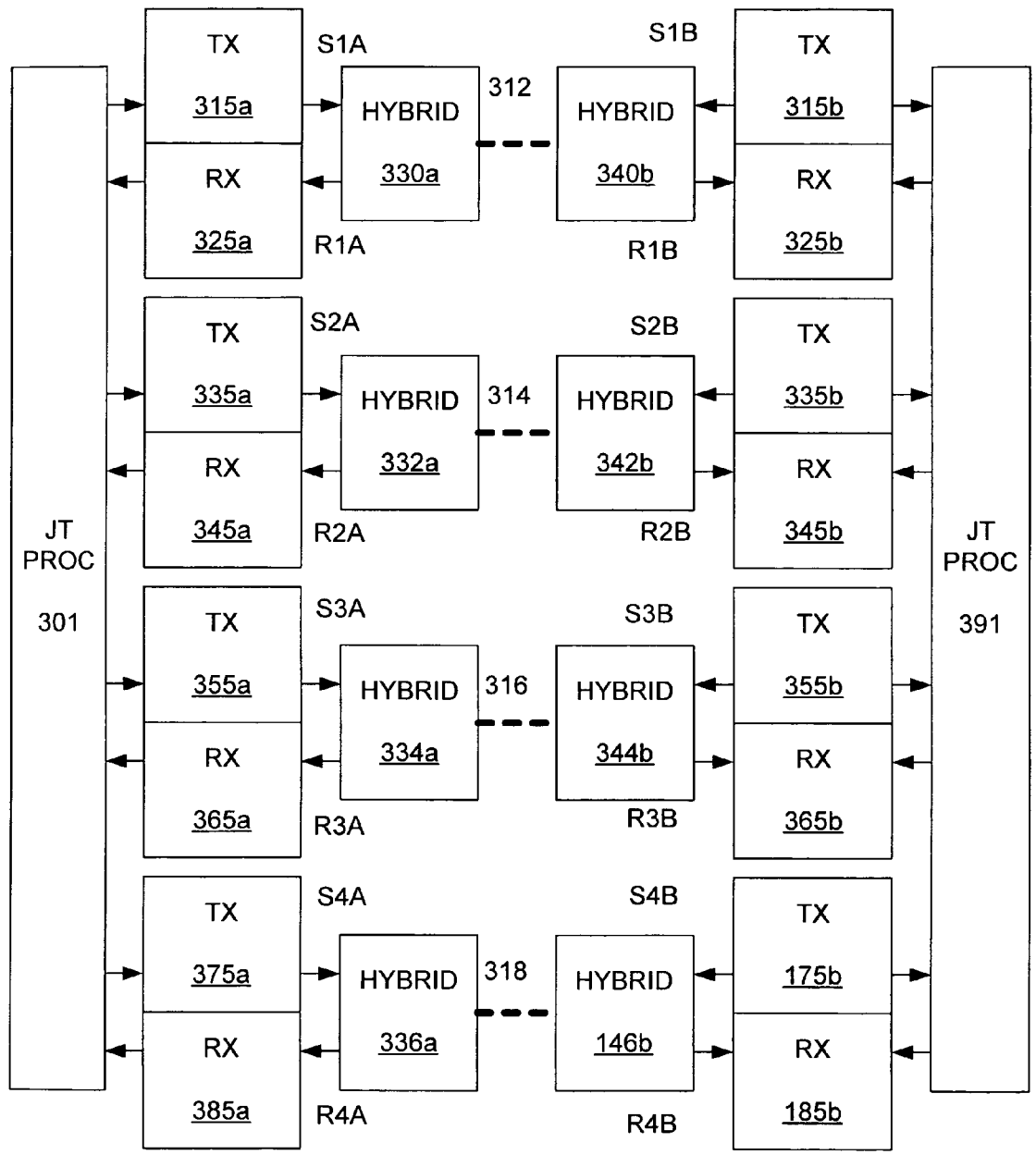
FIG. 3 shows an Ethernet transceiver, according to an embodiment of the invention.

FIG. 3 shows several Ethernet twisted pair LAN connections 312, 314, 316, 318 in parallel. This embodiment includes sub-block joint processors 301, 391 that include sub-block joint processing of signals transmitted and received over the twisted pair LAN connections 312, 314, 316, 318. The sub-block joint processing reduces the effects of interference and echo signals, on signals transmitted and received over the twisted pair LAN connections 312, 314, 316, 318.

The first connection 312 is between a first transmitter 315$a$ (S1A) and first receiver 325$a$ (R1A), and a second transmitter 315$b$ (S1B) and a second receiver 325$b$ (R1B). The second connection 314 is between a third transmitter 335$a$ (S2A) and third receiver 345$a$ (R2A), and a fourth transmitter 335$b$ (S2B) and a fourth receiver 345$b$ (R2B). The third connection 316 is between a fifth transmitter 355$a$ (S3A) and fifth receiver 365$a$ (R3A), and a sixth transmitter 355$b$ (S3B) and a sixth receiver 365$b$ (R3B). The fourth connection 318 is between a seventh transmitter 375$a$ (S4A) and seventh receiver 385$a$ (R4A), and an eighth transmitter 375$b$ (S4B) and an eighth receiver 385$b$ (R4B).

The transmission signals S1A, S1B, S2A, S2B, S3A, S3B, S4A, S4B include digital signal streams. Due to the close proximity of the transmission signals S1A, S1B, S2A, S2B, S3A, S3B, S4A, S4B and R1A, R1B, R2A, R2B, R3A, R3B, R4A, R4B the digital signal streams are coupled, causing both far-end cross-talk (FEXT) and near-end cross-talk (NEXT) interference within the digital signal streams. Additionally, echo signals interfere with each of the digital signal streams.

NEXT is caused by interference due to signals generated at the near-end of a neighboring twisted pair connection. For example, NEXT interference includes the transmitter signals S1A, S3A, S4A of transmitters 315$a$, 355$a$, 375$a$ interfering with receiver signal R2A of receiver 345$a$. FEXT is caused by interference due to signals generated at the far-end of a neighboring twisted pair connection. For example, FEXT interference includes the transmitter signals S1B, S3B, S4B of transmitters 315*b*, 355*b*, 375*b* interfering with receiver signal R2A of receiver 345*a*. Other interference includes the echo signal. For example, the echo signal includes interference the signal S2A of transmitter 335*a* interfering with the receiver signal R2A of receiver 345*a*. Additional interference includes inter-symbol interference (ISI). ISI is self-interference of the transmit signal S2B at the input R2A of the receiver 345*a*. Other interference can include alien signal interference. Alien signal interference generally includes interference due to other Ethernet twisted pair LAN connections.

Figure 4:
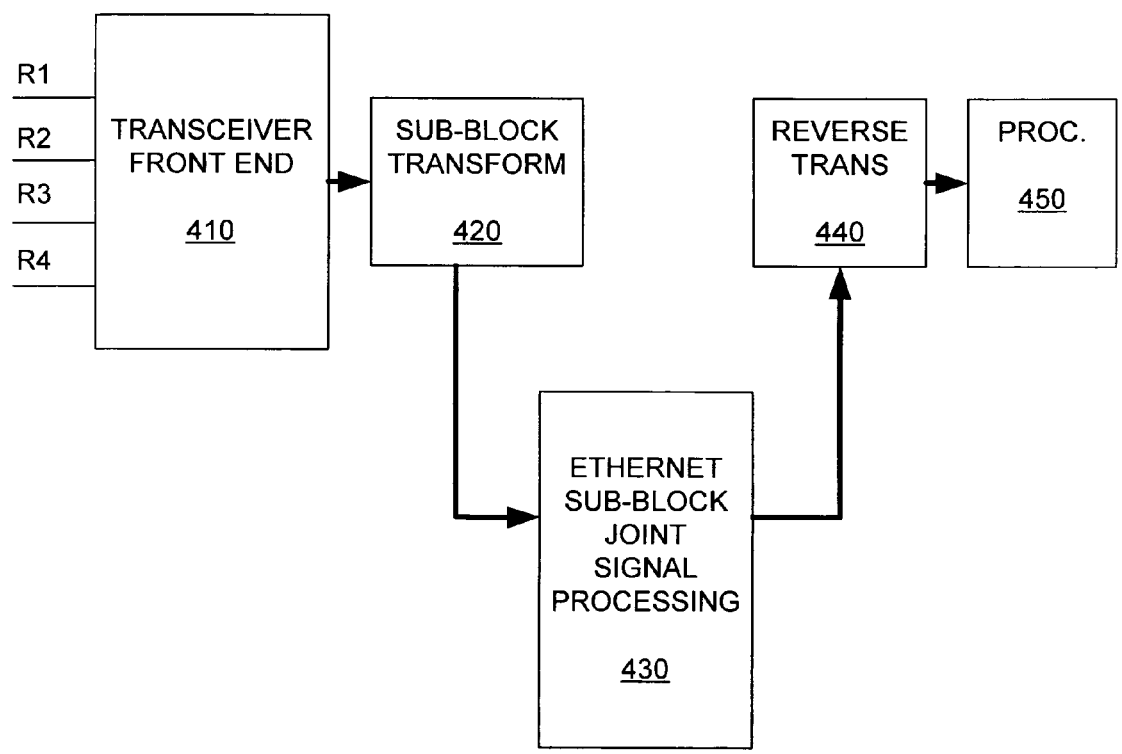
FIG. 4 shows an Ethernet receiver, according to an embodiment of the invention.

FIG. 4 shows an Ethernet receiver. The embodiment of FIG. 4 is a receiver that includes an analog front end 410, a transform section 420, a sub-block joint processing section 430, and a reverse transform section 440. The analog front end 410 receives a plurality (here, there are four) of transmission signals R1, R2, R3, R4. The received transmission signals R1, R2, R3, R4 can represent either of the earlier described received signals R1A, R2A, R3A, R4A or R1B, R2B, R3B, R4B.

The transform section 420 transforms each of the digital signal streams from an original domain into a lower complexity domain. An implementation of the transform includes a discrete Fourier transform (DFT) that transforms the digital signal streams from the time domain to the new domain. An efficient discrete Fourier transform is a fast Fourier transform (FFT). However, other examples of possible transforms include a discrete cosine transform, a discrete wavelength transform, a discrete Hartley transform and multi-rate filter transforms. The general premise is that the transform provides a different domain in which processing of the digital signal streams can be implemented with less complex electronic circuitry (for example, less multiplies and accumulates, slower clocks, etc.).

The transform section 420 selects blocks of samples from the digital signal streams for transformation. One embodiment includes continuously selecting blocks of samples, such as, 768 samples, and transforming each block of the digital signal streams. Limits naturally exist on size of the blocks. If the blocks are too small, processing based upon the blocks can introduce distortion. Therefore, generally the blocks include enough samples of the digital signal streams that the distortion does not occur. The minimum number of samples required to be within a block is generally limited by what is termed the "filter time sample span." The time duration of samples included within a block should be greater than the filter time sample span. It should be noted that the required block size can vary between the echo signal processing, the NEXT signal processing, and between FEXT signal processing and ISI signal processing.

Echo interference is primarily caused by reflections or mismatches at the hybrid, the connectors or the twisted pairs. Most of the echo signal energy is contained within a signal's first round trip reflections. With a twisted pair length of 100 meters, the round trip distance is approximately 200 meters, and takes about 1 us. For most 10 GBase-T applications, the typical echo span time is between 100 and 1000 ns. A typical NEXT time span is 50 to 500 ns. A typical FEXT time span is 10 to 100 ns. A 10 GBase-T DAC/ADC samples at approximately 1 GHz, resulting in coupling FIR responses having blocks of 100 to 1000 samples for echo interference, 50 to 500 samples for NEXT interference and 10 to 100 samples for FEXT interference. If, for example, the echo block size is 1000 samples and the NEXT block size is 300 samples, joint transform processing of echo and NEXT requires a block size of greater than 1000 samples.

Another embodiment includes dividing the blocks of digital signal streams into smaller sub-block, such as 128 samples, and individually transforming each sub-block. As will be described below, dividing the sub-blocks allows each sub-block to be individually jointly processed. Performing the joint sub-block processing before inverse transforming the sub-blocks greatly reduces the complexity of the total joint processing. This can greatly reduce the latency of the joint processing. The processing of sub-blocks begins before a whole block of samples has been received, whereas block processing generally requires the whole block of digital samples to be received before processing of the block begins. Therefore, the sub-block processing reduces the latency of the processing. Additionally, the sub-block processing can provide more efficient processing of multiple digital signal streams. The filter time sample span of the different types of interference is typically different. Proper selection of the size of the sub-blocks allows the effective block sizes of the different types of distortion to vary, typically as a multiple of the sub-block size, which allows a minimization of the required joint processing.

The joint processing section 430 joint processes the transformed digital signal streams sub-blocks. Each joint processed digital signal stream sub-block is influenced by each of the other digital signal streams. Various embodiments of the joint processing section 430 include processing that reduces the effects of NEXT and FEXT interference, and reduces the effects of echo signals. The transformed digital signal stream sub-blocks are jointly processed. That is, the sub-block processing of each digital signal stream is dependent upon characteristics (interference and echo) of the other digital signal streams being processed. More specifically, for an Ethernet system that includes four digital signal streams (four transmitting streams, and four receiving streams) electrically coupled to four neighboring twisted pair of a communication link, the joint processing of each sub-block transformed digital signal stream is dependent upon interference caused by the other digital signal streams.

The sub-block joint processing can include a sub-block matrix multiplication of each of the transformed sub-block digital signal streams with appropriate de-coupling matrices. The matrix multiplication of the four transformed digital signal streams generates four jointly sub-blocked processed outputs. The elements of the sub-block matrices are selected to reduce the effects caused by interference due to coupling of the digital signal streams during transmission over the communications link, and self-interference, such as ISI. The elements can be additionally influenced by the effects of echo signals.

The inverse transform section 440 inverse transforms the joint processed signal stream sub-blocks back to the original domain. Generally, the original domain is the time domain.

Figure 5:
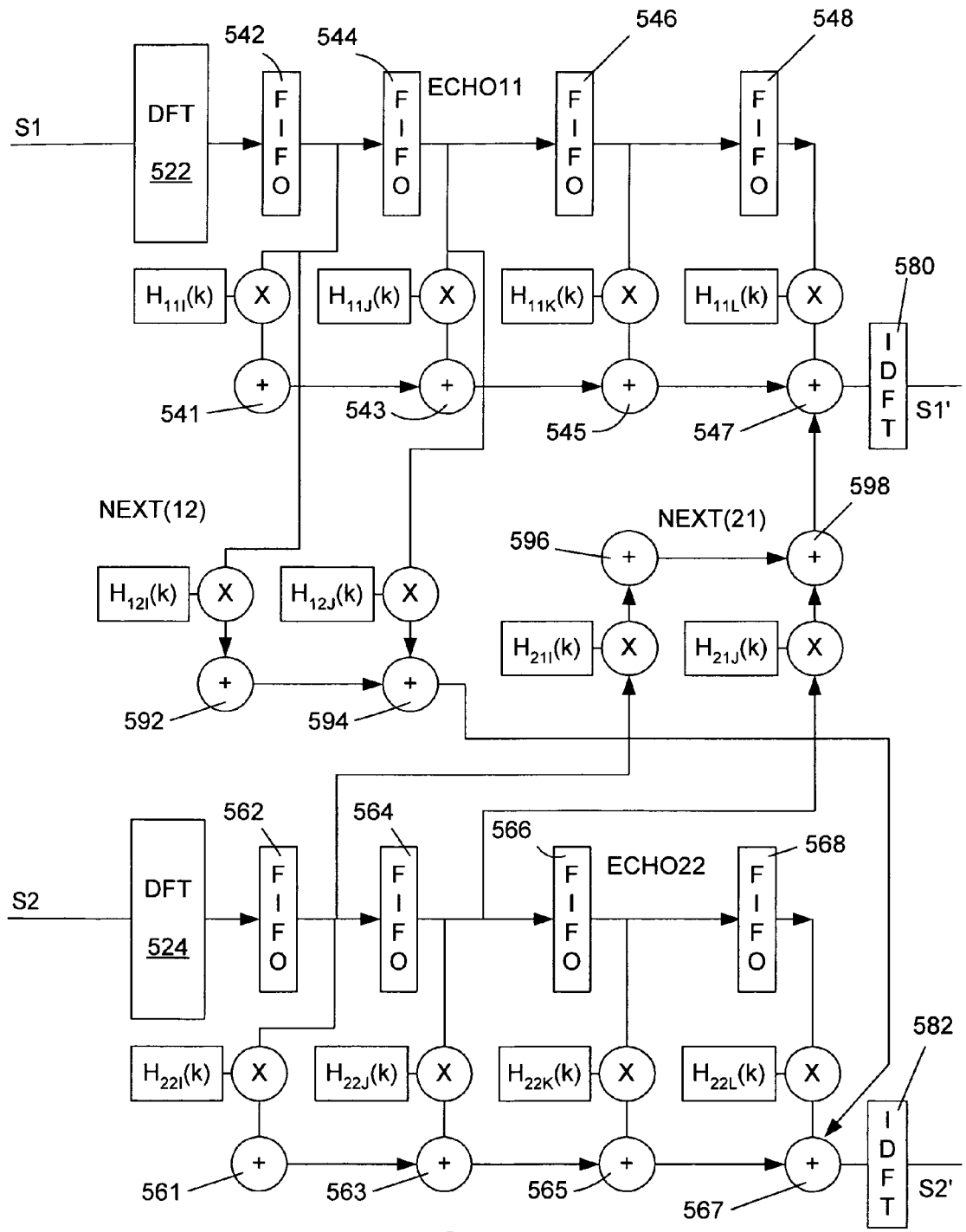
FIG. 5 shows greater detail of a portion of an Ethernet transceiver that include sub-block processing, according to an embodiment of the invention.

FIG. 5 shows greater detail of an Ethernet transceiver. This embodiment is simpler than the embodiment of FIG. 3 because this embodiment only includes two digital signal streams (S1, S2) of the Ethernet transceiver. The signal streams (S1, S2) are sub-block joint processed generating digital signal streams (S1', S2'). All of the signal streams (S1, S2) are used to estimate each individual single signal stream. The number of received signal streams can easily be increased. The processed digital signal streams (S1', S2') could be summed with signal streams of either a receiver or a transmitter to minimize the effects of the signal interference. As shown in FIG. 5, the processed digital signal streams S1' generates an echo11 and NEXT21 interference correction signal, and the processed digital signal stream S2' generates an echo 22 and NEXT12 interference correction signal.

The digital signal streams (S1, S2) are sub-blocked and transformed to a simpler domain (requiring less complex electronic circuitry) by transform blocks 522, 524.

An embodiment of the joint processing of the transceiver includes echo processing. The echo processing of FIG. 5 includes matrix multiplication of four 128 sample sub-blocks. A block in FIG. 5 includes four sub-blocks, and therefore, a block includes 512 samples. The sample time of the 512 samples must be greater than the previously described filter time sample span. Typically, the block size is two times or more than the filter time sample span.

The sub-block joint signal processing (ECHO 11, NEXT 12) section includes four memory elements 542, 544, 546, 548 (shown as FIFO(s)). Each memory element 542, 544, 546, 548 stores a sub-blocks worth of digital signal stream samples. The four sub-blocks combined to span a block equivalent. As a new sub-block worth of samples are received, the memory elements 542, 544, 546, 548 shift the stored sub-blocks over by one memory element. Therefore, the joint sub-block processing is always performed on the most recently received four sub-blocks of the received digital signal streams. The number of memory elements is selectable, and is dependent upon the desired block and sub-block sizes.

For echo processing, each sub-block of the memory elements 542, 544, 546, 548 is multiplied by a corresponding echo sub-block joint processing filter. The first sub-block of the first memory element 542 is multiplied by a sub-block joint processing filter $H_{11I}(k)$, the second sub-block of the second memory element 544 is multiplied by a sub-block joint processing filter $H_{11J}(k)$, the third sub-block of the third memory element 546 is multiplied by a sub-block joint processing filter $H_{11K}(k)$, and the fourth sub-block of the fourth memory element 548 is multiplied by a sub-block joint processing filter $H_{11L}(k)$. The sub-block echo processed outputs are summed by summers 541, 543, 545, 547.

For NEXT (NEXT(12)) processing, each sub-block of the memory elements 542, 544 is multiplied by a corresponding NEXT sub-block joint processing filter. The first sub-block of the first memory element 542 is multiplied by a sub-block joint processing filter $H_{12I}(k)$, and the second sub-block of the second memory element 544 is multiplied by a sub-block joint processing filter $H_{12J}(k)$. For the NEXT processing, the two samples are combined to span a block equivalent. The previously described filter time sample span is smaller for NEXT processing than for echo processing. Therefore, the block size required for NEXT processing is smaller than for echo processing.

The sub-block joint signal processing (ECHO 22, NEXT 21) section includes four memory elements 562, 564, 566, 568 (shown as FIFO(s)). Each memory element 562, 564, 566, 568 stores a sub-blocks worth of transformed digital signal stream samples. The four sub-blocks combined to form a block.

For echo processing, each sub-block of the memory elements 562, 564, 566, 568 is multiplied by a corresponding echo sub-block joint processing filter. The first sub-block of the first memory element 562 is multiplied by a sub-block joint processing filter $H_{22I}(k)$, the second sub-block of the second memory element 564 is multiplied by a sub-block joint processing filter $H_{22J}(k)$, the third sub-block of the third memory element 566 is multiplied by a sub-block joint processing filter $H_{22K}(k)$, and the fourth sub-block of the fourth memory element 568 is multiplied by a sub-block joint processing filter $H_{22L}(k)$. The sub-block echo processed outputs are summed by summers 561, 563, 565, 567.

For NEXT processing, each sub-block of the memory elements 562, 564 is multiplied by a corresponding NEXT sub-block joint processing filter. The first sub-block of the first memory element 572 is multiplied by a sub-block joint processing filter $H_{21I}(k)$, and the second sub-block of the second memory element 574 is multiplied by a sub-block joint processing filter $H_{21J}(k)$. The previously described filter time sample span is smaller for NEXT processing than for echo processing. Therefore, the block size required for NEXT processing is smaller than for echo processing.

Inverse transform blocks 580, 582 inversely transforms outputs of the summer 547, 567. The output of the inverse transform block 580 is a first estimate of the first digital signal stream S1'. Additional time processing can be included to refine the first estimate, or to reduce the number of $H_{ijL}$ matrix terms. The output of the inverse transform block 582 is a first estimate of the second digital signal stream S2'. Additional time processing can be included to refine the first estimate.

The joint processing shown in FIG. 5 can be used for both receive processing and transmit processing. An embodiment includes the same size sub-blocks being used for both transmit and receive joint processing. Another embodiment includes common sub-block transformers for both transmit and receive joint processing. Clearly, this can reduce the amount of electronics hardware required for the combined transmit and receive joint processing.

The accuracy of each joint sub-block can dependent upon a magnitude of the coupling. More specifically, the bit width of the sub-block joint processing can be reduced for subsequent sub-blocks within a joint processing chain of sub-blocks due to decreasing energy of interference coupling for longer time spans. For example, the echo interference sub-block chain of FIG. 5 could include memory elements 542, 544, 546, 548 having decreasing bit width that corresponds to decreasing signal energy.

Another embodiment of the joint processing includes a subset of the sub-block filters being disabled when the coupling is below a threshold. For example, an echo signal can include a higher energy signal component at a time span that is greater than a lower energy signal component. If the lower time span, lower energy signal component falls below a predetermined threshold, the corresponding joint sub-block filter could be eliminated. The cable lengths and connector types can cause the echo signal interference to vary greatly. Short cables typically include higher energy interference over shorter time spans, whereas long cables typically include higher energy interference over larger time spans. The threshold could be determined by evaluating the receiver noise level, and targeting the canceled echo or NEXT/FEXT level to be below the noise level.

Figure 6:
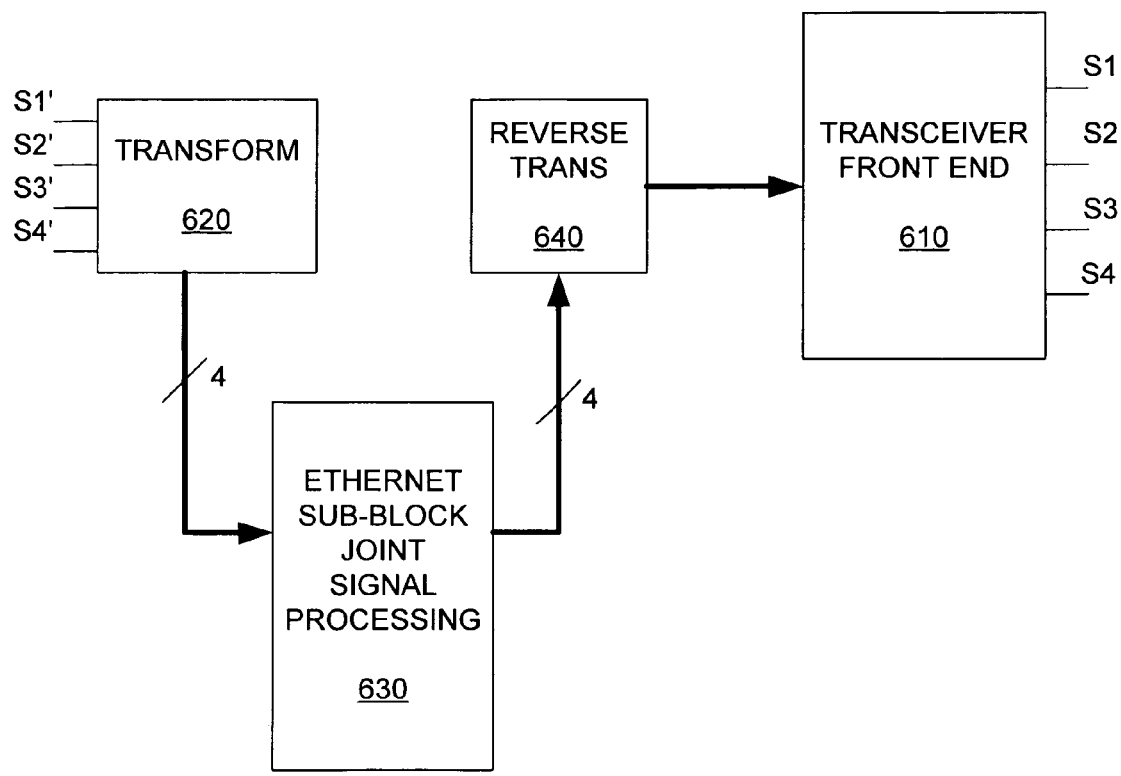
FIG. 6 shows an Ethernet transmitter, according to an embodiment of the invention.

FIG. 6 shows an Ethernet transmitter, according to an embodiment of the invention. The transmitter receives digital signal streams S1', S2', S3', S4' for transmission over an Ethernet channel. The sub-block joint processing is used in this embodiment to pre-process the digital signal streams before the digital signal streams are transmitted. The pre-processing reduces the effective interference between the digital signal streams after transmission over the Ethernet channel.

Transform block 620 transforms each of the digital signal streams from an original domain into a lower complexity-processing domain, and forms sub-blocks. The lower complexity domain allows the joint processing of the digital signal stream sub-blocks to be more easily implemented.

Ethernet sub-block joint signal processor 630 sub-block joint processes the transformed digital signal stream sub-blocks, each joint processed digital signal stream sub-block being influenced by other digital signal stream sub-blocks. The elements of the sub-block joint processing matrices can be dynamically determined to allow a continuous reduction of transmission interference.

The joint processing includes FEXT and ISI sub-block joint processing. An implementation of the FEXT and ISI processing is very similar to the NEXT and echo sub-block joint processing described and shown in FIG. 5.

Inverse transform block 640 inverse transforms the joint processed signal stream sub-blocks back to the original domain.

Front end transceiver 610 generates analog signals from the processed digital signal streams for transmission over an Ethernet channel.

Figure 7:
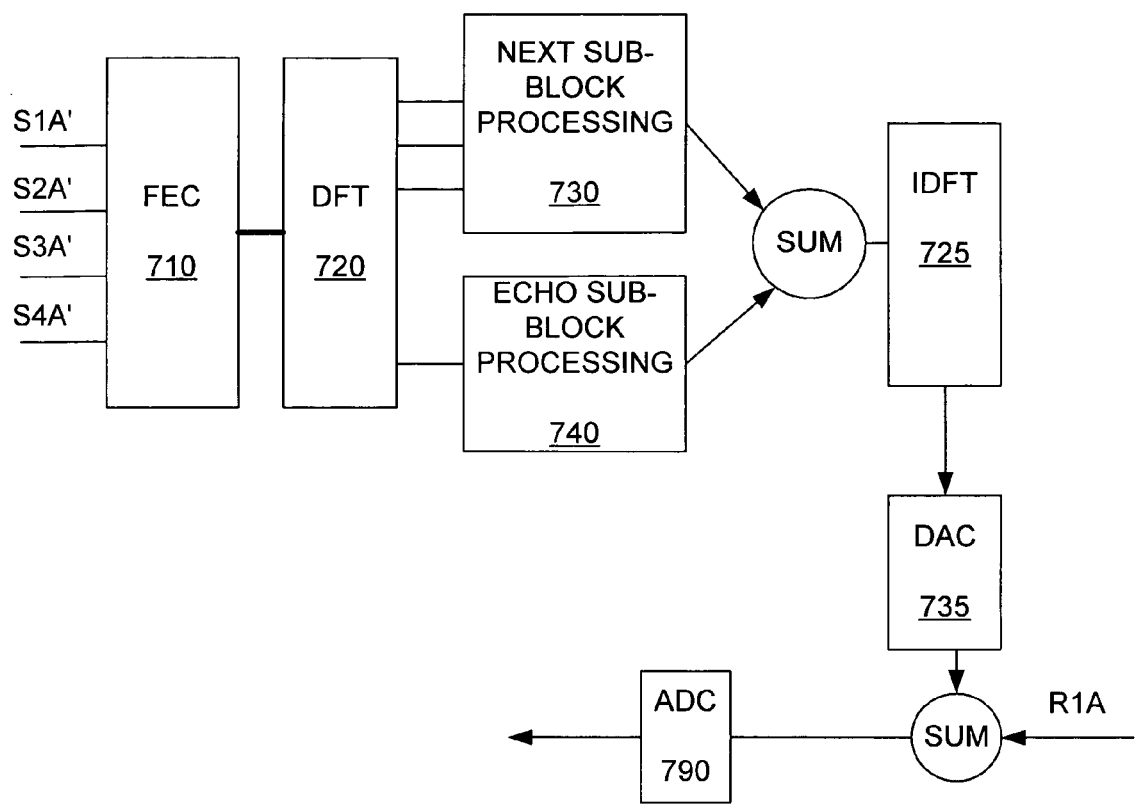
FIG. 7 shows greater detail of an Ethernet transmitter that includes near-channel sub-block processing

FIG. 7 shows greater detail of an Ethernet transmitter that includes near-channel sub-block processing. The near-channel processing includes NEXT sub-block processing and echo sub-block processing. The sub-block processing generally includes filtering the transmission signals S1', S2', S3', S4'. The filtered point processed) output can be summed with the received signals to reduce the effects of the NEXT and echo interference.

The transmission signals S1', S2', S3', S4' are passed through a FEC (forward error corrector) 710.

A DFT block 720 performs a discrete Fourier transform on the transmission signals.

A NEXT block 730 performs near-channel sub-block signal processing of the transmission signals. The near-channel signal sub-block processing provides estimates the NEXT interference of the transmission signals.

An echo block 740 performs echo sub-block processing of the transmission signals. The near-channel signal sub-block processing also provides estimates the echo signal interference of the transmission signals.

The processes sub-block signal streams are summed with a received signal stream R1A to reduce the effects of near channel interference on the received signal stream R1A. Specifically, the estimates of the NEXT interference and the echo interference are summed with the received signal stream R1A to minimize the actual NEXT and echo interference.

An inverse discrete transform (IDFT) 725 transforms the correction signals (NEXT and echo) back to the original (generally, time) domain.

A DAC 735 converts the correction signal from a digital signal to an analog signal, allowing the correction signal to be summed with an analog received signal stream R1A. Another embodiment includes the correction signal being summed with the received signal stream as a digital signal rather than as an analog signal. Another embodiment includes the correction signal being summed with the received signal stream before being converted back to the original domain. That is, before being transformed back to the original domain by the IDFT 725.

An ADC 790 converts the corrected received signal into a digital signal stream for additional receiver processing. The ADC 790 can be simplified by summing the correction signal in the analog domain prior to the ADC 790.

Figure 8:
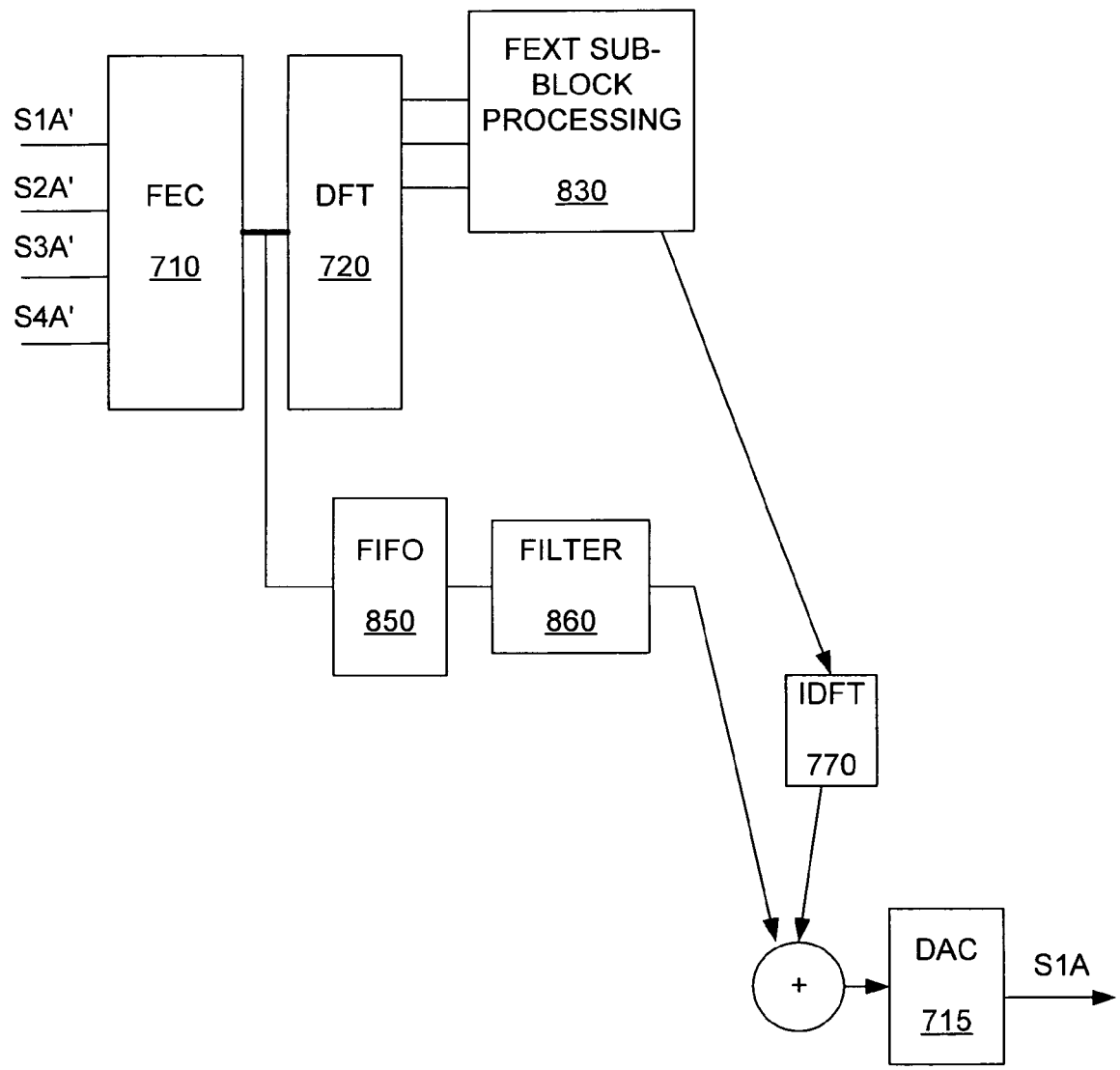
FIG. 8 shows greater detail of another Ethernet transmitter that includes far-channel sub-block processing.

FIG. 8 shows greater detail of another Ethernet transmitter that includes far-channel sub-block processing. This embodiment includes a FEXT sub-block processor 830 which generates a far-channel correction signal to be summed with a transmit signal S1A before being transmitted. The correction signal reduces the effects of FEXT interference by summing a correction signal with the transmit signal S1A.

The FEC 710 and DFT 720 include the same designators as in FIG. 7 to show that they can be used for both FEXT and NEXT processing.

The transmit signal S1A is passed through a FIFO 850 and a filter 860.

The correction signal of the FEXT processor 830 is transformed to the original domain by an IDFT 770, and then summed with the transmit signal S1A, preprocessing the transmit signal S1A to reduce the effects of FEXT and ISI interference suffered by the transmit signal S1A during transmission through an Ethernet channel.

FIG. 8 includes an DAC 715 which convert the preprocessed transmit signal to an analog signal for transmission through the Ethernet channel.

FIG. 9 shows acts of a method of joint processing a plurality of digital signal streams, according to an embodiment of the invention.

A first act 910 includes transforming each of the digital signal stream sub-blocks from an original domain into a lower complexity domain.

A second act 920 includes joint processing of the transformed sub-blocks of the digital signal streams, each joint processed digital signal stream sub-block being influenced by characteristics of other digital signal stream sub-blocks.

A third act 930 includes inverse transforming the joint processed signal stream sub-blocks back to the original domain.

Matrix Joint Signal Processing

Joint matrix signal processing of the invention includes estimating the transmission characteristics of the Ethernet signals of an Ethernet connection. The characteristics include interference (NEXT, FEXT, ISI, ANEXT) and echo signals.

The transmission characteristics can generally be divided into two sets of matrices, a set of near-channel matrices, and a set of far-channel matrices. Estimates of the near-channel matrices and the far-channel matrices are used in the joint processing of the Ethernet signals. The near-channel matrices and a far-channel matrices can be estimated by transmitting known digital signal streams, and analyzing the resulting response at a desired receiver.

Near-Channel Matrix

Referring to FIGS. 3 and 5, the receivers associated with transceiver A and the joint processor 301, receive Ethernet digital signal streams R1A, R2A, R3A, R4A when the transmitters 315a, 335a, 355a, 375a are transmitting, and transmitters 315b, 335b, 355b, 375b are not transmitting. For a two stream receiver as shown in FIG. 5, a channel matrix ha can be used to approximate the signal streams R1A, R2A having been transmitted as digital signal streams S1A, S2A. That is, transceiver A receives the digital signal streams S1A, S2A after the digital signal streams pass through a near-end Ethernet transmission channel ha. The received digital signal streams R1A, R2A can be approximated as (neglecting noise and alien cross-talk):

$$R1A = ha11 \copyright S1A + ha12 \copyright S2A$$

$$R2A = ha21 \copyright S1A + ha22 \copyright S2A$$

where the $h_{ij}$ elements of the ha matrix are the impulse responses of the coupling that generates the interference of the received digital signal streams R1A, R2A, and where the symbol © denotes a convolution.

For the two signal stream receiver of FIG. 5, each of the elements of the transmission channel can be expanded into four sub-block channel matrices for the echo terms and two sub-block channel matrices for the NEXT terms. That is:

$$ha11 = h_{11I} + h_{11J}D^{-M} + h_{11K}D^{-2M} + h_{11L}D^{-3M}$$

$$ha12 = h_{12I} + h_{12J}D^{-M} + 0 + 0$$

$$ha21 = h_{21I} + h_{21J}D^{-M} + 0 + 0$$

$$ha22 = h_{22I} + h_{22J}D^{-M} + h_{22K}D^{-2M} + h_{22L}D^{-3M}$$

where D signifies delay, and M is the sub-block size.

A vector ra can be used to represent a vector that includes the received digital signal streams. More specifically, ra= [R1A, R2A]. A vector sa can be used to represent the transmitted digital signal streams. More specifically, sa= [S1A, S2A]. For this representation, ra=ha©sa, and $$ha = \begin{bmatrix} ha11 & ha12 \\ ha21 & ha22 \end{bmatrix}$$

For the receiver of FIG. 5, ha can be represented with the sub-block matrices as:

$$ha = \begin{bmatrix} h11I & h12I \\ h21I & h22I \end{bmatrix} + \begin{bmatrix} h11J & h12J \\ h21J & h22J \end{bmatrix} D^{-M} + \begin{bmatrix} h11K & 0 \\ 0 & h22K \end{bmatrix} D^{-2M} + \begin{bmatrix} h11L & 0 \\ 0 & h22L \end{bmatrix} D^{-3M}$$

This matrix equation of ha, provides a model of the echo and NEXT interference signals this matrix can be generated by transmitting known signals, and observing the resulting received signals. The ha estimation can be performed, for example, during power-up of the Ethernet transceivers. The estimation of the ha matrix allows the determination of sub-block joint processing (filters) for reducing effects of echo and NEXT cross-talk.

The diagonal terms hjj of the ha matrices represent the impulse responses of the echo signal coupling. The off-diagonal terms hij (i≠j) of the ha matrix represent the impulse responses of the NEXT coupling. The transceiver (transceiver A) has information regarding the ra and sa vectors, and can use this information to approximate ha. The transceiver can use the known information of ra and sa to generate processing (filtering) to approximate ha. An estimate of est_ha can be adaptively determined by minimizing the error of:

$$est\_ha © sa - ra = \text{error}.$$

The error minimization can also be determined in the transformed domain. That is, the above equation could have been minimized before inverse transforming all of the components back to the original domain.

The estimation can be performed adaptively using a least mean square (LMS) or a recursive least square (RLS) algorithm. Both during and after convergence of the algorithms, the transceiver computes an est_ha, and filters the vector signals sa based upon the est_ha. The receiver portions of the transceiver subtract the joint aggregate signal (est_ha©sa) from the received signals ra. More specifically, the receivers compute a minimization of:

$$ra - (est\_ha © sa) = (ha © sa) - (est\_ha © sa).$$

As previously stated, during calibration, ra and sa are known quantities. By determining an estimate of the near-end channel (est_ha), joint processing can be performed on received and transmitted signal streams to minimize signal interference. The joint processing can be simplified for high throughput Ethernet transmission channels, by performing the joint processing in a less-complex domain.

The transmitted digital signal steams sa are transformed (represented by Sa) to the lower processing complexity domain. The estimate of the near-end channel matrix est_ha is transformed (represented by est_Ha) to the less complex domain. A near-end correction signal (Ena) can be determined by multiplying the transformed signal steam Sa with the transformed near-end channel matrix est_Ha). The near-end correction signal (Ena) is then transformed (ena) back to the original domain. The inverse transformed signal ena can be subtracted from received signals to reduce the effects of near-channel interference.

For typical Ethernet values of P and N, high echo and NEXT interference cancellation can be achieved with lower complexity processing. Moreover, if the receiver is also performing frequency domain processing of the received signal ra to reduce ISI, FEXT and/or ANEXT, and the signals and transformations have related sub-block sizes and delays, the inverse transform of a transmitter can be combined with the inverse transform of a receiver, allowing more reduction in processing complexity.

Far-Channel Matrix

Referring to FIG. 3, the receivers associated with transceiver A and the joint processor 301, receive Ethernet digital signal streams R1A, R2A when the transmitters 315*b*, 335*b* are transmitting, and transmitters 315*a*, 335*a*, are not transmitting. A channel matrix hb can be used to approximate the signal streams R1A, R2A, having been transmitted as digital signal streams S1B, S2B. That is, transceiver A receives the digital signal streams S1B, S2B, after the digital signal streams pass through a far-end Ethernet transmission channel hb. The received digital signal streams R1A, R2A can be approximated as (neglecting noise and alien cross-talk):

$$R1A = hb11 © S1B + hb12 © S2B$$

$$R2A = hb21 © S1B + hb22 © S2B$$

where the $h_{ij}$ elements of the hb matrix are the impulse responses of the coupling that generates the interference of the received digital signal streams R1A, R2A.

For a two signal stream transceiver, each of the elements of the transmission channel can be expanded into four sub-block channel matrices for the ISI terms and two sub-block channel matrices for the FEXT terms. That is:

$$hb11 = h_{11I} + h_{11J}D^{-M} + h_{11K}D^{-2M} + h_{11L}D^{-3M}$$

$$hb12 = h_{12I} + h_{12J}D^{-M} + 0 + 0$$

$$hb21 = h_{21I} + h_{21J}D^{-M} + 0 + 0$$

$$hb11 = h_{22I} + h_{22J}D^{-M} + h_{22K}D^{-2M} + h_{22L}D^{-3M}$$

where D signifies delay, and M is the sub-block size.

A vector ra can be used to represent a vector that includes the received digital signal streams. More specifically, ra= [R1A, R2A]. A vector sb can be used to represent the transmitted digital signal streams. More specifically, sb= [S1B, S2B]. For this representation, ra=hb©sb, and $$hb = \begin{bmatrix} hb11 & hb12 \\ hb21 & hb22 \end{bmatrix}$$

For a two input transceiver having four consecutive jointly processed sub-blocks, hb can be represented with sub-block matrices as:

$$hb = \begin{bmatrix} h11I & h12I \\ h21I & h22I \end{bmatrix} + \begin{bmatrix} h11J & h12J \\ h21J & h22J \end{bmatrix} D^{-M} + \begin{bmatrix} h11K & 0 \\ 0 & h22K \end{bmatrix} D^{-2M} + \begin{bmatrix} h11L & 0 \\ 0 & h22L \end{bmatrix} D^{-3M}$$

This matrix equation of hb, provides a representation of the ISI and FEXT interference signals. For example, this matrix can be generated by transmitting known signals, and observing the resulting received signals. The hb estimation can be performed, for example, during power-up of the Ethernet transceivers. The estimation of the hb matrix allows the determination of sub-block joint processing (filters) for reducing effects of ISI and FEXT cross-talk.

The diagonal terms hjj of the hb matrix represent the impulse responses of the ISI signal coupling. The off-diagonal terms hij (i≠j) of the hb matrix represent the impulse responses of the FEXT coupling. The transceiver (transceiver A) has information regarding the ra and sb vectors, and can use this information to approximate hb. Typically, the transmitted signal sb is known (e.g. a training signal) or can be estimated from the demodulation of ra. The transceiver can use the known information of ra and sb to generate processing (filtering) to approximate hb. An estimate of hb, denoted as est_hb can be adaptively determined by minimizing the error of:

est_hb⊙sb−ra=error.

The estimation can be performed adaptively using a least mean square (LMS) or a recursive least square (RLS) algorithm. Both during and after convergence of the algorithms, the transceiver computes an est_hb. The receiver post-processes est_hb, and computes a joint matrix equalizer. A pseudo-inverse of est_hb (denoted as Inv_est_hb) can be performed to provide a solution for a joint matrix equalizer for est_hb. Application of the joint matrix equalizer Inv_est_hb on the received vector signal ra generates an estimate of the signal sb transmitted from transceiver B, denoted est_sb. This joint matrix operation jointly equalizes the received vector, and reduces the effects of FEXT coupling across the signal streams. More specifically, the receivers compute a minimization of:

sb−(Inv_est_hb⊙ra)=sb−(Inv_est_hb⊙est_hb⊙sb)= sb−est_sb.

As previously stated, during calibration, ra and sb are known quantities. Determining an estimate of the far-end channel (est_hb) and the joint equalizer (Inv_est_hb), allows joint processing on received and transmitted signal streams for reduction of signal interference. The joint processing can be simplified for high throughput Ethernet transmission channels, by performing the joint processing in a less-complex domain.

The received digital signal steams ra are transformed (represented by Ra) to the less complex domain. The estimate of the far-end channel matrix equalizer Inv_est_hb is transformed (represented by Inv_est_Hb) to the less complex domain. An estimate of the transmitted digital stream (est_Sb) is determined by multiplying the transformed signal steam Ra with the transformed near-end channel matrix (Inv_est_Hb). The estimate of the transmitted digital stream (est_Sb) is then transformed (est_sb) back to the original domain. This estimate can be post-processed in subsequent functions of the receiver (slicing, error correction, scrambling, etc.).

Other joint processing receivers are possible. For example, the joint matrix equalizer Inv_est_hb can be computed directly from the known signals ra and sb, without requiring the intermediate step of estimating est_hb.

Additionally, nonlinear matrix equalizers are possible, such as DFE (decision feedback equalizers) or other variants of multi-user detection where the partial estimates of est_sb are used iteratively.

Partial Time Domain Processing

In some applications, the transform domain processing can be shared with partial time domain processing for more efficient overall processing. For example consider the case of Near-channel matrix ha in which the diagonal elements of ha, hajj have much longer coupling impulse responses than the off-diagonal elements of ha, haij (j≠j). This situation is common for Ethernet transceivers, because the Echo (diagonal) is often longer than the NEXT (off-diagonal). If the transform domain processing requires a transform block processor where the size of data to process must be larger than the longest coupling impulse response, then all the joint domain transformation may be done using the block size of length larger the diagonal elements of ha. The diagonal impulse responses can be decomposed into two components hajj=hajjD+hajjT, in which hajjD is shorter than hajj and has a length similar to haij (j≠j). The new impulse responses hajjD can be used in the joint transform domain processor and hajjT can be used in the time domain processing. That is, the joint domain transformation is performed on the new Near channel;

$$haD = \begin{bmatrix} ha11D & ha12 & ha13 & ha14 \\ ha21 & ha22D & ha23 & ha24 \\ ha31 & ha32 & ha33D & ha34 \\ ha41 & ha42 & ha43 & ha44D \end{bmatrix}$$

and the remaining processing of hajjT is performed in the time (or other) domain. Another alternative includes performing a second joint domain transform processing on the remaining hajjT.

A third matrix hc can be estimated for alien signals. However, known signals generally cannot be transmitted to estimate the effects of alien signals. Therefore, some type of blind estimation techniques are typically used.

Performance Advantages Offered by Domain Transformation Processing

Examples can be provided to demonstrate the advantages of domain transformation joint processing of Ethernet transmission signals over time domain joint processing of Ethernet transmission signal to reduce the effects of transmission interference. The examples provided include DFT transformations, however, other domain transformations can be used.

Typical Ethernet LAN connections suffer from self-interference (ISI, echo interference) and/or cross talk interference (NEXT, FEXT) that spans anywhere from 10 samples to 1000 samples depending on the type of interference. Echo interference and NEXT interference typically require longer spans of 100-1000 samples, and FEXT and ISI require shorter spans of 10-100 samples. Other factors that effect the number of required samples includes the Ethernet cable length and cable type (cat5, 5e, 6, 6e 7, etc). For simplification, 100 samples is used for the following examples.

Time Domain Processing

To implement a single FIR with P real valued coefficients, a standard processor must perform P real valued multiplies and adds for each desired filtered output sample. This number greatly increases for the Ethernet filtering because the Ethernet transceiver must process multiple transmit signals and multiple receive signals. Additionally, the Ethernet transceiver mitigates coupling of the multiplicity of signals.

Simpler Domain Processing

Alternatively, the signals can be transformed into a domain where filtering is simpler, such as the DFT domain. The filtered results can be inverse transformed back to the original domain. The nominal complexity of a real valued DFT is of order $N*\log 2(N)$, where N is the block size of the DFT. The exact complexity depends on the input being real or complex valued and implementation details of the DFT, such as FFT size, radix size, memory vs area/speed/latency tradeoffs. Filtering in the DFT transform domain dictates a point by point multiplication of the N samples of DFT processed data with the N DFT samples of the filter. When the application permits processing of N samples at a time, to the first order, filtering N real samples requires $N*\log 2(N)+2N+N*\log 2(N)$ operations. Computing a filter of length P using a DFT of size N, generates N-P filtered sampled per transformation. The complexity per sample is in the order of $(2*\log 2(N)+2)/(1-N/P)$. Whenever the length of the FIR, P, is significantly larger than $2*\log 2(N)$ there can be significant simplifications in complexity, and therefore, hardware costs and power dissipation. For example, if $N=256>2*P$ for the case of P=100, the transformed domain requires about $(2*\log 2(256)+2)/(1-100/256)=30$ mult/adds, and the standard implementations requires 100 multiplies and adds per output sample. Neglecting other HW implementation details such as memory, precision, clock rate, etc, this results in a net gain of approximately 3 times.

Matrix Joint Signal Processing

The hardware savings are much larger for the situation in which multiple coupled desired or undesired signals share a common communication channel, for example, Gigabit Ethernet over CAT-5/5e/6 having 4 twisted pairs per cable. In this case, each the 4 information-bearing signals transmitted over each of the 4 pairs interferes (cross-talks) with the neighbor 3 pairs (FEXT), and the 4 transmitted signals interfere with the four received signals (echo/NEXT). In this situation, multiple filtering operations must be performed for each of the 16 two pair combinations. For example, a first twisted pair interferes with the first twisted pair (echo), the first twisted pair interferes with a second twisted pair (NEXT and FEXT), an so forth for all of the twisted pairs. Therefore, the system may require many long FIR implementations simultaneously. Joint processing of all these signal (for example, matrix filter implementations) using the domain transformation and matrix filters results in very large reductions in the hardware required to implement the joint processing.

Consider two signal sources (x1, x2) and two matrix signal outputs (y1, y2) that are a function of the two signal sources. For this case, the input-output relationship is $$y1 = h11 © x1 + h12 © x2$$

$$y2 = h21 © x1 + h22 © x2$$

where '©' denotes convolution, and hij is the filter between input 'i' and output 'j'. The hii or diagonal terms model the self-interference (typically ISI or echo) and the off diagonal (h12 and h21) model the coupling or crosstalk interference (typically FEXT and NEXT and alien NEXT). Designating the length P of the 4 FIR hij, the direct implementation of this matrix filter requires $4*P$ MAC (multiple and accumulate) per output sample vector (y1, y2). The filter implementation can be greatly reduced by using the domain transformation with a DFT. FIR filtering in the DFT domain can be implemented with point wise products. The system first computes the DFT of each of the FIR responses Hij=DFT (hij), and store these values. In steady state the operations required are:

1. Performing two DFTs of size N, more precisely:

$$X1 = DFT(x1)$$

$$X2 = DFT(x2).$$

2. DFT domain filtering, which is performed by point by point multiplication. For example $$Y1 = H11*X1 + H12*X2$$

$$Y2 = H21*X1 + H22*X2$$

3. Finally, the desired outputs are;

$$y1 = IDFT(Y1)$$

$$y2 = IDFT(Y2).$$

Some minor pre/post processing may be required to account for edge effects, such as "overlap and add" or "overlap and save". The total steady state complexity for this implementation of the DFT domain transformation is two DFT of size N, 4N point wise MAC per sample in the transform domain, and two IDFT. For the DFT case the complexity of the direct and inverse transformation is the same. In the more general case of M inputs and L outputs, the complexity is M+L DFT/IDFTs of size N and $2*M*L*N$ point wise MAC for the DFT domain filtering (where the 2 is for complex arithmetic on real signals). Including the overlap, the number of joint filtered vector output samples per matrix block transformation is (N−P). Thus the operation complexity per output sample is of the order $$((M+L)*N*\log 2(N)+2*M*L*N)/(N-P)$$

or equivalently $$((M+L)*\log 2(N)+2*M*L)/(1-P/N)$$

For the direct FIR matrix implementation the total operation complexity is $M*L*P$ per filtered vector output sample of size L. Lets revisit the case of high data rate Ethernet systems, where M=L=4 and we choose P=100, N=256 for a good balance between overlap and latency. The operational complexity of the joint domain transformation is $$((4+4)*\log 2(256)+2*4*4)/(1-100/256)=157$$

and the standard implementation is $$4*4*100=1600$$

The savings in HW complexity, cost and power for this structure is in the order of 10 times. This saving can be even larger for Echo/NEXT cancellers, where P can be more than 500 coefficients.

The large savings of this structure can be used to increase the performance (throughput, reach) of the transceiver. For P=100 the performance of Echo and NEXT cancellation is poor. The low complexity of the proposed structure allows for increasing P greatly for better cross-talk cancellation, or to increase M or L for better alien cross-talk cancellation.

Improved Alien Cross-talk Cancellation

Similarly the joint transform processing can be used for alien cross-talk mitigation. Additional ADCs may be included to allow additional signal streams for improved performance or improved cancellation capability. For this situation, the number of inputs to the transform processor is larger (M>4), but the number of outputs can remain the same (L=4). Three additional ADCs provides a total of M=7 input streams. The total operational complexity of this joint transform processor is:

$$((7+4)*\log 2(256)+2*4*4)/(1-100/256)=197.$$

A transceiver with additional input streams with joint transform processing has much better alien cross-talk processing cancellation than the standard canceller with M=4, and has 8 times less operation complexity.

Although specific embodiments of the invention have been described and illustrated, the invention is not to be limited to the specific forms or arrangements of parts so described and illustrated. The invention is limited only by the appended claims.

What is claimed:

1. A transceiver comprising:
   a receiver receiving a plurality of digital signal streams, at least one of the plurality of digital signal streams being coupled to another of the plurality of digital signal streams;
   a domain transformer for transforming sub-blocks of at least one of the plurality of the digital signal streams from an original domain into a lower complexity domain, wherein each sub-block includes less digital signal stream samples than a block, wherein a block includes enough samples to exceed joint filter time sample spans of the plurality of digital signal streams;
   a processor for joint processing of the transformed sub-blocks of the plurality of digital signal streams, each of the joint processed digital signal stream sub-blocks being influenced by other digital signal streams sub-blocks; and
   an inverse transformer for inverse transforming the joint processed signal streams sub-blocks back to the original domain.

2. The transceiver of claim 1, wherein a block includes enough digital signal stream samples that transforming and processing blocks of the plurality of digital signal streams does not introduce distortion.

3. The transceiver of claim 1, wherein same size sub-blocks are used for transmit and receive joint processing.

4. The transceiver of claim 1, wherein the domain transformer uses common sub-block transformers for both transmit and receive joint processing.

5. The transceiver of claim 1, wherein a coupling defines how much of the at least one of the plurality of digital signal streams is coupled to another of the plurality of digital signal streams, and an accuracy of each joint sub-block is dependent upon a magnitude of the coupling.

6. The transceiver of claim 1, wherein a coupling defines how much of the at least one of the plurality of digital signal streams is coupled to another of the plurality of digital signal streams, and the joint processing comprises sub-block filters, and a subset of the sub-block filters are disabled when the coupling is below a threshold.

7. The transceiver of claim 1, wherein the joint processing includes multiplying each of the digital signal streams sub-blocks with sub-block processing matrices.

8. The transceiver of claim 7, wherein diagonal elements of the sub-block processing matrices are selected to reduce inter-symbol interference of the digital signal streams.

9. The transceiver of claim 8, wherein diagonal elements of the sub-block processing matrices are adaptively selected.

10. The transceiver of claim 9 wherein diagonal elements of the sub-block processing matrices are adaptively selected depending upon signal coupling and inter-symbol interference measurements.

11. The transceiver of claim 7, wherein off-diagonal elements of the sub-block processing matrices are selected to reduce cross-talk between the digital signal streams.

12. The transceiver of claim 11, wherein the off-diagonal elements of the sub-block processing matrices are adaptively selected.

13. The transceiver of claim 12, wherein off-diagonal elements of the sub-block processing matrices are adaptively selected depending upon signal coupling and inter-symbol interference measurements.

14. The transceiver of claim 7, wherein the receiver is receiving the digital signal streams, and the off-diagonal elements of the sub-block processing matrices are selected to cancel transmission cross-talk of the digital signal streams introduced during transmission of the digital signal streams.

15. The transceiver of claim 7, wherein the receiver is receiving the digital signal streams, and the diagonal elements of the sub-block processing matrices are selected to cancel transmission cross-talk of the digital signal streams introduced during reception of the digital signal streams.

16. The transceiver of claim 1, wherein the plurality of digital signal streams comprises signals for transmission by the transceiver.

17. The transceiver of claim 16, wherein the joint processing provides reduction of near end cross talk.

18. The transceiver of claim 16, wherein the joint processing provides reduction of alien near end cross talk.

19. The transceiver of claim 16, wherein the joint processing provides reduction of echo signal interference.

20. The transceiver of claim 1, wherein at least one digital signal stream includes time domain processing.

21. The transceiver of claim 1, wherein the joint processing of the transformed signal streams is performed on signal streams to be transmitted.

22. The transceiver of claim 1, wherein the joint processing of the transformed signal streams is performed on received signal streams.

23. The transceiver of claim 1, including N digital signal streams, and M joint processed signal streams.

24. The transceiver of claim 1, including N digital signal streams, and a single joint processed signal stream.

25. The transceiver of claim 1, wherein the transform block additionally transforms filtering coefficients.

26. The transceiver of claim 1, wherein the joint processing comprises filtering coefficients, and the filtering coefficients of the joint processing are determined to reduce interference between Ethernet digital signal streams.

27. The transceiver of claim 26, wherein the filtering coefficients include a transfer domain representation of a time domain filter.

28. The transceiver of claim 1, wherein the joint processing provides reduction of far end cross talk.

29. The transceiver of claim 1, wherein the joint processing provides reduction of inter-symbol interference.

30. A transceiver comprising:
the transceiver receiving a plurality of digital signal streams, at least one of the plurality of digital signal streams being coupled to another of the plurality of digital signal streams;
a transformer for transforming sub-blocks of at least of the plurality of the digital signal streams from an original domain into a new domain that allows for less complex processing, wherein a sub-block includes less digital signal stream samples than a block, wherein a block includes enough digital signal stream samples that transforming and processing blocks of the plurality of digital signal streams does not introduce distortion;
a processor for joint processing of the transformed sub-blocks of the plurality of digital signal streams, each of the joint processed digital signal stream sub-blocks being influenced by other digital signal streams sub-blocks; and
an inverse transform block for inverse transforming the joint processed signal stream sub-blocks back to the original domain.

31. A transmitter comprising:
the transmitter receiving a plurality of digital signal streams for transmission, at least one of the plurality of digital signal streams being coupled to another of the plurality of digital signal streams;
a transformer for transforming sub-blocks of at least one of the plurality of the digital signal streams from an original domain into a new domain that allows for less complex processing, wherein each sub-block includes less digital signal stream samples than a block, wherein a block includes enough samples to exceed joint filter time sample spans of the plurality of digital signal streams;
a processor for joint processing of the transformed sub-blocks of the plurality of digital signal streams, each of the joint processed digital signal stream sub-blocks being influenced by other digital signal streams sub-blocks;
an inverse transform block for inverse transforming the joint processed signal stream sub-blocks back to the original domain; and
an analog front end for transmitting the joint processed signal streams.

32. A receiver comprising:
an analog front end for receiving analog signal streams, and generating a plurality of digital signal streams, at least one of the plurality of digital signal stream being coupled to another of the digital signal streams;
a transformer for transforming sub-blocks of at least one of the plurality of the digital signal streams from an original domain into a new domain that allows for less complex processing, wherein each sub-block includes less digital signal stream samples than a block, wherein a block includes enough samples to exceed joint filter time sample spans of the plurality of digital signal streams;
a processor for joint processing of the transformed sub-blocks of the plurality of digital signal streams, each of the joint processed digital signal stream sub-blocks being influenced by other digital signal streams sub-blocks;
an inverse transform block for inverse transforming the joint processed signal stream sub-blocks back to the original domain.

33. A method of joint processing a plurality of digital signal streams;
transforming a plurality of the digital signal streams from an original domain into a lower complexity processing domain, wherein each sub-block includes less digital signal stream samples than a block, wherein a block includes enough samples to exceed joint filter time sample spans of the plurality of digital signal streams;
joint processing of the transformed sub-blocks of the plurality of the digital signal streams, each of the joint processed digital signal stream sub-block being influenced by characteristics of other of the joint processed digital signal stream sub-blocks, wherein the joint processing includes multiplying each of the digital signal streams sub-blocks with sub-block processing matrices, and diagonal elements of the sub-block processing matrices are selected to cancel transmission cross-talk of the digital signal streams introduced during reception of the digital signal streams;
inverse transforming the joint processed signal stream sub-blocks back to the original domain.

34. The method of claim 33, wherein same size sub-blocks are used for transmit and receive joint processing.

35. The method of claim 33, wherein the transforming uses common sub-block transformers for both transmit and receive joint processing.

36. The method of claim 33, wherein a coupling defines how much of the at least one of the plurality of digital signal streams is coupled to another of the plurality of digital signal streams, and an accuracy of each joint sub-block is dependent upon a magnitude of the coupling.

37. The method of claim 33, wherein a coupling defines how much of the at least one of the plurality of digital signal streams is coupled to another of the plurality of digital signal streams, and the joint processing comprises sub-block filters, and a subset of the sub-block filters are disabled when the coupling is below a threshold.

38. The method of joint processing of claim 33, wherein transforming additionally includes transforming filtering coefficients.

39. The method of joint processing of claim 33, wherein a maximal amount of Ethernet signal interference minimization processing is performed in the lower complexity domain.

40. The method of joint processing of claim 33, wherein filtering coefficients of the joint processing are determined to minimize interference between Ethernet digital signal streams.

41. The method of joint processing of claim 33, wherein the digital signal streams are transmitted over an Ethernet network.

42. The method of joint processing of claim 33, wherein the joint processing provides reduction of near end cross talk.

43. The method of joint processing of claim 33, wherein the joint processing provides reduction of alien near end cross talk.

44. The method of joint processing of claim 33, wherein the joint processing provides reduction of far end cross talk.

45. The method of joint processing of claim 33, wherein the joint processing provides reduction of inter-symbol interference.

46. The method of joint processing of claim 33, wherein the joint processing provides reduction of echo signal interference.

47. The method of claim 33, wherein the transmission cross-talk of the digital signal streams introduced during reception of the digital signal streams comprises echo transmission cross-talk.

48. A network line card, the network line card comprising a bi-directional transceiver, the bi-directional transceiver comprising:
- a receiver receiving a plurality of digital signal streams, at least one of the plurality of digital signal streams being coupled to another of the plurality of digital signal streams;
- a domain transformer for transforming sub-blocks of at least one of the plurality of the digital signal streams from an original domain into a lower complexity domain, wherein each sub-block includes less digital signal stream samples than a block, wherein a block includes enough samples to exceed joint filter time sample spans of the plurality of digital signal streams;
- a processor for joint processing of the transformed sub-blocks of the plurality of digital signal streams, each of the joint processed digital signal stream sub-block being influenced by other digital signal streams sub-blocks; and
- an inverse transformer for inverse transforming the joint processed signal streams sub-blocks back to the original domain.

49. A method of joint processing a plurality of digital signal streams;
- transforming a plurality of the digital signal streams from an original domain into a lower complexity processing domain, wherein each sub-block includes less digital signal stream samples than a block, wherein a block includes enough samples to exceed joint filter time sample spans of the plurality of digital signal streams;
- joint processing of the transformed sub-blocks of the plurality of the digital signal streams, each of the joint processed digital signal stream sub-block being influenced by characteristics of other of the joint processed digital signal stream sub-blocks, wherein the joint processing includes multiplying each of the digital signal streams sub-blocks with sub-block processing matrices, and off-diagonal elements of the sub-block processing matrices are selected to cancel transmission cross-talk of the digital signal streams introduced during transmission of the digital signal streams;
- inverse transforming the joint processed signal stream sub-blocks back to the original domain.

50. The method of claim 49, wherein the transmission cross-talk of the digital signal streams introduced during reception of the digital signal streams comprises near-end cross-talk.

* * * * *